United States Patent Office 3,843,476
Patented Oct. 22, 1974

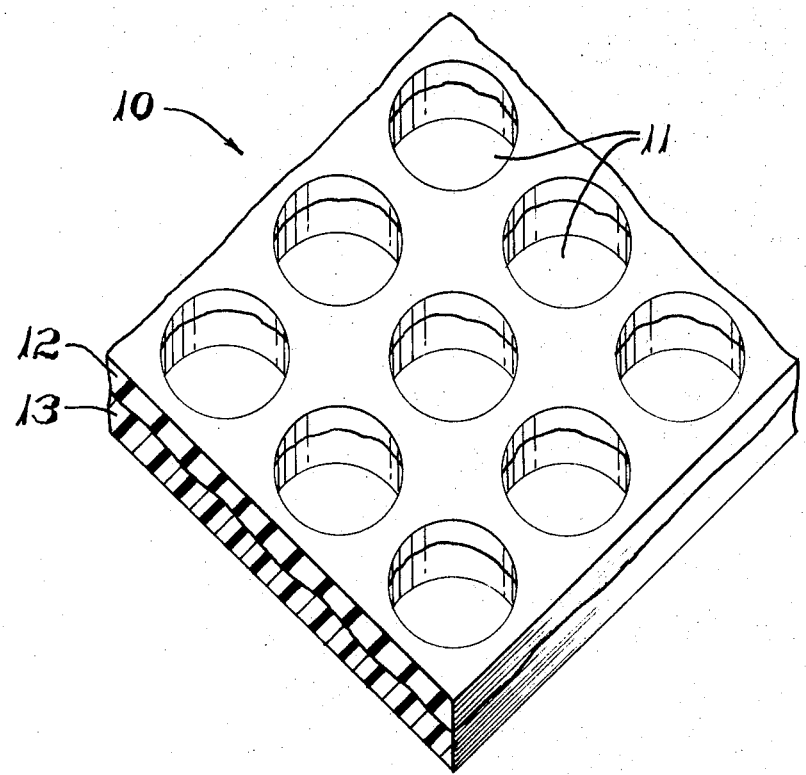
Fig.1
Fig.2
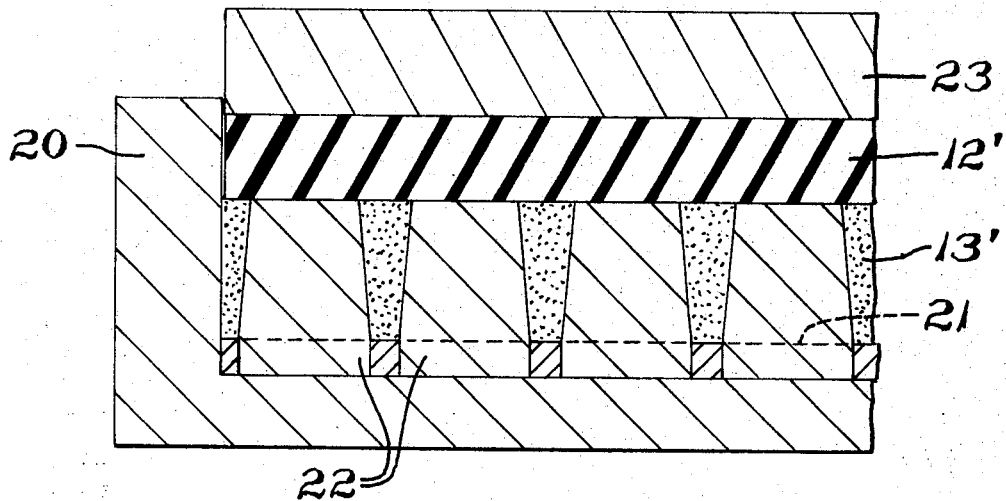

3,843,476
PERFORATE ARTICLE AND METHOD
OF MAKING SAME
James H. Kramer, Akron, Ohio, assignor to The B. F.
Goodrich Company, New York, N.Y.
Filed May 19, 1972, Ser. No. 255,131
Int. Cl. B32b 3/10
U.S. Cl. 161—112                                2 Claims

ABSTRACT OF THE DISCLOSURE

A perforated particle screen having a base layer or high density polyethylene low melting index thermoplastic material with a cover layer of elastomeric material vulcanized integrally with the base layer.

BACKGROUND OF THE INVENTION

Particle screens for use in grinding mills as a grate at the discharge end are designed such that the charge or load in the mill will not pass through the screen until it has been reduced to particle size less than the size of the perforations or apertures in the screen. The grate is often provided with a resilient cover to prevent destructive abrasion of the grate from the particle matter being crushed or ground in the mill.

In fabricating a grinding mill discharge grate or screen, a slight taper is provided to the holes or apertures in the grate to aid in preventing clogging of the apertures by irregularly shaped particles attempting to pass through the grate. Furthermore, it has been desirable to provide a semi-rigid or somewhat resilient surface to the apertures in the grate to further aid in preventing clogging of the grate. A grate or screen having a resilient or rubber-covered surface must necessarily have a rigid backing or supports to support the resilient surface against the forces of the charge in the mill. Theretofore, mill discharge grates have been made by perforating a rigid metal plate, usually steel, and applying rubber thereover.

Previous attempts to provide such a grate have generally involved laminating rubber sheet stock to the surface of a metal plate and perforating or punching the desired grating holes in the rubber-covered metal plate. A grate fabricated in this manner often has the rubber cover torn irregularly or perforated in such a manner that the walls of the holes through the grate do not have the desired taper to permit proper passage of the particles. It has generally been found quite difficult to provide a resiliently covered grate or screen with the perforations formed to the proper configuration by punching or perforation after application of the rubber sheet stock to the metal plate. Consequently, one method of overcoming the difficulty has been to drill the holes. This, however, is expensive and generally requires two separate drilling operations to secure the proper diameter holes in the rubber and backing respectively. Similar problems are encountered in making rubber-covered shaker screens.

In order to produce a mill grate, or screen, of the above-described type with the perforations or holes having the desired tapered configuration, attempts have been made to mold a rubber covering integral with a pre-perforated metal backing plate, obtaining desired configuration of the holes by inserts or pins provided in the mold. This technique has proven prohibitively costly and unwieldy because the perforated metal backing plate must be punched and placed in a mold, with inserts provided in the punched apertures for forming the holes in the elastomer. The mold must then be loaded with the uncured rubber and the rubber vulcanized over the inserts integral with the metal backing plate. The vulcanized screen is then removed from the mold and subsequent individual inserts removed from the apertures of the metal plate which is prohibitively time consuming.

It will be evident, therefore, that it has long been desirable to find a simple and inxpensive means of providing a resiliently surfaced, substantially rigid, perforate member suitable to serve as a grate for grinding mills, such that the surface of the member, exposed to the particulate matter, a shaker screen, or similar article, is resilient but the member possesses the desired overall rigidity. Further, it has been desirable to provide such an article which is lighter in weight and more resistant to corrosion than those previously available.

SUMMARY OF THE INVENTION

The present invention provides a solution to the problem of making a grinding mill discharge grate, shaker screen, or similar article which will give long useful life, be lighter in weight, have greater resistance to corrosion and less expensive to manufacture than prior perforate members of this type. The grate, shaker screen, or similar perforate article is made in a simple one-step procedure which obviates the necessity of molding elastomeric material to a prefabricated metal plate or on subsequent punching or drilling operation.

The screen, or grate, of the present invention is characterized by having a base, or backing, layer of rigid thermoplastic, high density, high molecular weight, polyethylene material and a cover layer of resilient vulcanized elastomeric material, the elastomeric cover layer being vulcanized integrally with the thermoplastic base. The screen is fabricated by charging a mold, having inserts for providing the desired aperture shape, with the thermoplastic material in granular form, covering the mold charge with a quantity of unvulcanized elastomeric material and applying heat and pressure to the materials such that the thermoplastic material melts and flows about the mold inserts while the elastomeric material flows about the mold inserts above the thermoplastic material, is vulcanized and is integrally interlocked to the base material to form this completed article. Upon cooling and removal from the mold, the article has perforations, or apertures, of the desired configuration molded therein with the wall of the perforations formed partially of elastomer and partially of thermoplastic material.

The present invention thus provides a unique screen for a grinding mill discharge grate, shaker screen, or other perforate article having a surface layer of elastomeric material for abrasion resistance and a base layer of rigid thermoplastic material which provides a rigid, noncorrosive backing. The screen of the present invention is fabricated by a novel single step procedure in which the thermoplastic, in granular form, and elastomer, preferably in sheet form, are simultaneously molded and the elastomer vulcanized by application of heat and pressure.

BRIEF DESCRIPTION OF THE DRAWINGS

FIG. 1 is an oblique view of a portion of a screen embodying the present invention;

FIG. 2 is a fragmentary sectional view taken through a curing mold and shows the granular thermoplastic charge and the uncured elastomer prior to application of heat and pressure to the mold.

DETAILED DESCRIPTION

Figure 3:
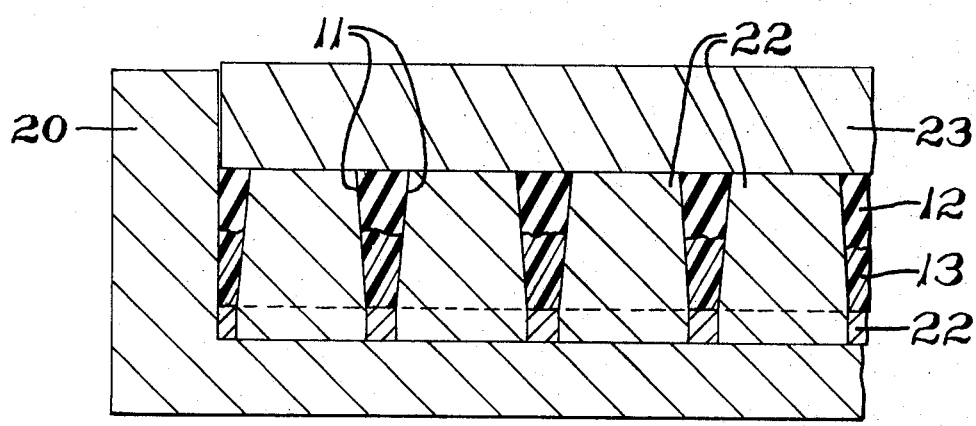
FIG. 3 is a view similar to FIG. 2 showing the configuration of the elastomer and thermoplastic in the heated state with the mold in closed position.

Referring now to FIG. 1, the invention is illustrated as it is embodied in a perforate article or screen 10, having a plurality of perforations or holes 11 extending through the integrally united resilient cover 12 and substantially rigid base 13. The holes 11 have a diameter determined by the desired size of the particles that are to pass through the screen, while the spacing is determined by the requirements for strength and rate of flow of material through the screen. The holes are preferably of circular configuration and are tapered axially with the larger diameter being provided at the outer surface of the base 13. In the presently preferred practice of the invention, the cover 12 comprises a wear resistant vulcanized elastomer and the base layer 13 is preferably formed of high molecular weight polyethylene having a melt flow index less than 0.15 measured in accordance with the test procedures of ASTM D1238-65T, modified by an additional 3 kg. load.

The thermoplastic material must be chosen so as to have a melting temperature less than the vulcanizing temperature of the elastomeric material to which it is to be bonded. Stated conversely, the elastomeric material must have a vulcanizing temperature higher than the melting temperature of the thermoplastic material. The material known commercially by the trade name "Hostalen" GUR and sold by Farbwerke Hoescht AG, Frankfurt, Germany, has been found particularly suitable. However, the choice of thermoplastic is not limited to any particular trade-named material and other high density polyethylene materials may be used. Although the mechanism by which cover layer 12 and the base layer 13 are firmly bonded together is not fully understood, it is apparent that the adjacent faces thereof are at least in part mechanically interlocked at the interface thereof by mutual penetration of each into the other during molding. There may also be some chemical cross linking. In any event, the result is an integral, unitary finished article. The interlocking is believed to occur by the heated elastomeric material flowing intermediate the molecules at the interface of the two materials as the thermoplastic melts and the elastomer subsequently undergoes vulcanization in this configuration.

Referring now to FIG. 2, a mold 20 is provided with a cavity having a plurality of inserts 22 which are removably attached to a removable plate 21. The mold may be used for manufacturing screens having different perforation and size spacing by providing a plurality of plates, each having a different configuration of inserts 22 attached thereon. Thus, if it is desired to make screens or grates of different sizes or spacing of apertures from the same mold 20, the plate 21 containing the inserts may be easily removed from the mold and another plate having a different insert configuration inserted in the mold. It will be apparent that alternatively, a plate having integral projections thereon may be used. The mold is provided with a movable pressure ram 23 closely interfitting the inner periphery of the mold, the ram being separately powered by force exerting means (not illustrated) for applying pressure to the mold charge. It will be understood to those skilled in the art of molding elastomeric material that the mold can be vented for the escape of trapped air and excess elastomeric and thermoplastic material.

The screen of the present invention is fabricated by filling the mold spaces between the inserts 22 with the previously described high molecular weight polyethylene material 13' in granular form. Preferably, the granular material is filled in the mold to a level not exceeding the height of the inserts. A charge of unvulcanized elastomer 12', preferably in sheet form, is then applied over the granular thermoplastic material 13' and the inserts 22. The mold is then brought to the desired vulcanizing temperature which causes the granular polyethylene material to melt. Pressure applied to the elastomeric material, as it is heated, by the ram 23, thus causes the elastomeric material to compress the melting granular plastic which flows between the inserts as the plastic changes from granular to a homogenous viscous state. As the granular plastic melts, the press ram lowers until the ram is in contact with the mold inserts 22 such that the elastomeric material is forced to flow between the inserts, in the space provided by the contracting level of the melting plastic, completely filling the space between the mold inserts 22. For elastomeric material not containing natural rubber, it is desirable to coat the surface of the rubber to be joined prior to vulcanization with a peroxide, such as, for example, tertiary butyl perbenzoate or hydrogen peroxide, before applying the rubber to the plastic. The mold, in the closed position with a heated charge at vulcanizing temperature, is illustrated in FIG. 3.

Upon opening of the mold, preferably after at least partial cooling, the plate 21, with inserts 22, may be removed from the mold and the particle screen ejected conveniently therefrom with the base and cover integrally united in a unitary article. The screen is preferably removed from the mold prior to complete cooling.

In the presently preferred practice of the invention, the height of the granular material, as loaded in the mold, is approximately 2.5 times its cured depth. Furthermore, in the presently preferred practice of the invention, the thickness of the base layer of the completed article is substantially the same as the thickness of the cover layer of elastomeric material. However, the thermoplastic base may range from ⅓ to ½ the overall thickness of the finished article. Thus, for example, for a one-inch overall thickness of screen, a one-inch depth of granular material can be used for charging the mold, and, on curing the level of the thermoplastic, would be approximately mid-depth of the mold inserts.

The present invention thus provides a solution to the problem of coating the surface and apertures of a grinding mill discharge grate with a resilient material in a manner which enables the grate to be manufactured in a single step procedure and at low cost. The invention provides a screen having an integrally molded surface of vulcanized elastomer and a base of thermoplastic material, thus providing a lighter weight article of greater corrosion resistance than those employing metal reinforcement.

Modifications and variations of the present invention will be apparent to those having ordinary skill in the art and the invention is limited only by the following claims.

I claim:

1. A molded perforate article comprising:
  (a) a base layer formed of high molecular weight polyethylene having a low melt flow index;
  (b) a cover layer formed of vulcanized elastomeric material;
  (c) the melting temperature of the polyethylene being less than the vulcanizing temperature of the elastomeric material and the materials being subjected during molding to a temperature sufficient for vulcanizing the said elastomeric material so that the latter is integrally united with said base layer at the interface of the materials by mutual penetration of each into the other at the same interface while both materials were in hot plastic condition during the molding;
  (d) said base layer having its thickness in the range of ⅓ to ½ of the overall thickness of said article; and,
  (e) the perforations of said article being tapered with the larger dimension of each opening being at the outer surface of said base layer.

2. The perforate article defined in claim 1, wherein said polyethylene has a density greater than 0.9 gm./cm.$^3$ in the homogeneously molded state and a melt flow index less than 0.15 measured in accordance with the test procedures of ASTM 1238–65T modified with a supplementary load of 3 kg.

References Cited

UNITED STATES PATENTS

| | | | |
|---|---|---|---|
| 2,412,905 | 12/1946 | Nievwenhvis | 209—85 |
| 2,964,187 | 12/1960 | Riedel | 209—392 |
| 3,018,891 | 1/1962 | Bergstrom | 209—397 |
| 3,256,132 | 6/1966 | Williams | 161—254 |

FOREIGN PATENTS 1,912,870   3/1969   Germany.

GEORGE F. LESMES, Primary Examiner

P. J. THIBODEAU, Assistant Examiner

U.S. Cl. X.R.

161—109, 247; 209—233, 397